(12) United States Patent
Lu et al.

(10) Patent No.: US 10,865,121 B2
(45) Date of Patent: Dec. 15, 2020

(54) METHOD OF MAKING AN INORGANIC PLATINUM COMPOUND

(71) Applicant: Tripod Nano Technology Corporation, Taoyuan (TW)

(72) Inventors: Lin Lu, Taoyuan (TW); Kuei-Sheng Fan, New Taipei (TW); Chun-Lun Chiu, Pingtung County (TW); Han-Wu Yen, Taoyuan (TW); Chi-Jiun Peng, Taipei (TW); Cheng-Ding Wang, Taoyuan (TW); Jim-Min Fang, Taipei (TW)

(73) Assignee: TRIPOD NANO TECHNOLOGY CORPORATION, Taoyuan (TW)

( * ) Notice: Subject to any disclaimer, the term of this patent is extended or adjusted under 35 U.S.C. 154(b) by 39 days.

(21) Appl. No.: 16/279,081

(22) Filed: Feb. 19, 2019

(65) Prior Publication Data

US 2020/0180976 A1    Jun. 11, 2020

(30) Foreign Application Priority Data

Dec. 7, 2018   (TW) .............................. 107144228 A

(51) Int. Cl.
   *C01G 55/00*   (2006.01)
(52) U.S. Cl.
   CPC ........ *C01G 55/005* (2013.01); *C01P 2002/84* (2013.01); *C01P 2002/88* (2013.01)
(58) Field of Classification Search
   CPC ..... C01G 55/00; C01G 55/002; C01G 55/005
   See application file for complete search history.

(56) References Cited

U.S. PATENT DOCUMENTS

| | | | | |
|---|---|---|---|---|
| 4,119,702 A | * | 10/1978 | Azuhata | ................ B01D 53/56 423/235 |
| 4,941,917 A | | 7/1990 | Cenegy | |
| 2010/0224029 A1 | * | 9/2010 | Niisawa | ................ B01D 15/426 75/711 |

FOREIGN PATENT DOCUMENTS

| | | |
|---|---|---|
| CN | 101279772 A | 10/2008 |
| CN | 102774894 A | 11/2012 |
| CN | 103288147 A | 9/2013 |
| CN | 103288147 B | 3/2015 |
| CN | 103834808 B | 4/2016 |
| CN | 108929953 A | 12/2018 |

(Continued)

OTHER PUBLICATIONS

Alderden, R. A. et al. The Discovery and Development of Cisplatin. May 1, 2006.

(Continued)

*Primary Examiner* — Ngoc-Yen Nguyen
(74) *Attorney, Agent, or Firm* — Sinorica, LLC

(57) ABSTRACT

Provided is a method of making an inorganic platinum compound. The method includes the steps of: Step (A): providing a platinum material and a halogen-containing oxidizing agent; and Step (B): treating the platinum material with the halogen-containing oxidizing agent in a hydrochloric acid aqueous solution to obtain the inorganic platinum compound, including chloroplatinic acid or chloroplatinate salt; wherein the halogen-containing oxidizing agent excludes chlorine gas. The method of making an inorganic platinum compound is simple, safe, time-effective, cost-effective, and environment-friendly, and has the advantage of high yield.

11 Claims, 8 Drawing Sheets

(56) References Cited

FOREIGN PATENT DOCUMENTS

| | | |
|---|---|---|
| JP | 49-79395 | 7/1974 |
| JP | 2007302944 A | 11/2007 |
| JP | 2014-43611 | 3/2014 |
| JP | 2014-173107 A | 9/2014 |
| JP | 2014173107 A | 9/2014 |
| JP | 2016-11449 | 1/2016 |
| JP | 2017-157664 A | 9/2017 |
| KR | 20090132672 A | 12/2009 |
| RU | 2006120008 | 12/2007 |
| WO | 2007/080963 A1 | 7/2007 |

OTHER PUBLICATIONS

Rudnick, P. et al. The Preparation of Hydrochloroplatinic Acid by Means of Hydrogen Peroxide. Apr. 1917.
Speier, J. L. et al. The Addition of Silicon Hydrides to Olefinic Double Bonds. Part II. The Use of Group VIII Metal Catalysts. Feb. 20, 1957.
S. Young Tyree, Jr. Inorganic Syntheses, vol. IX. p. 182-185, 1967.
Georg Brauer. Handbook of Preparative Inorganic Chemistry V2. Jan. 1, 1965.
Zappi, Enrique V. V.. Preparaciön del äcido cloroplatinico y de los cloruros de oro y de paladio , In Anales de la.

\* cited by examiner

METHOD OF MAKING AN INORGANIC PLATINUM COMPOUND

CROSS-REFERENCE TO RELATED APPLICATION

Pursuant to 35 U.S.C. § 119(a), this application claims the benefit of the priority to Taiwan Patent Application No. 107144228 filed on Dec. 7, 2018. The content of the prior application is incorporated herein by its entirety.

BACKGROUND

1. Field of the Disclosure

The present invention relates to a method of making an inorganic platinum compound, more particular to a method of making a chloroplatinic acid and a chloroplatinate salt applicable in the fields of chemical analysis, electronics, biotechnology, and medicines.

2. Description of the Prior Arts

Platinum has good physical and chemical properties. A chloroplatinic acid and a chloroplatinate salt which include platinum can be used to form platinum-containing products such as catalysts, complex compounds, intermediates of organometallic compounds, metal platings, and nanoparticles. For example, a chloroplatinic acid, which is also called a hexachloroplatinic acid, usually exists in a form as the hexahydrate compound [$H_2PtCl_6 \cdot 6(H_2O)$]. $H_2PtCl_6 \cdot 6(H_2)$ can be an effective hydrosilylation catalyst in the addition reactions of silyl hydrides to alkenes. In addition, chloroplatinate salts contain sodium hexachloroplatinate ($Na_2PtCl_6$), potassium hexachloroplatinate ($K_2PtCl_6$), or ammonium hexachloroplatinate [$(NH_4)_2PtCl_6$]. The ammonium hexachloroplatinate can be employed in platinum electroplating. $K_2PtCl_6$ can be reduced with hydrazine ($N_2H_4$) to give dipotassium tetrachloroplatinite ($K_2PtCl_4$), which is utilized to synthesize the anti-cancer drug cisplatin [cis-$PtCl_2(NH_3)_2$]. Due to the simple structure of cisplatin and the clear mechanism of action after entering the body, it has triggered a craze for the pharmaceutical industry to study platinum-containing drugs. Thus, several platinum-containing drugs, such as Carboplatin, Oxaliplatin and Nedaplatin, have also been developed.

Platinum powder is the main raw material for preparation of the chloroplatinic acid and the chloroplatinate salts. Platinum is hardly dissolved in a common acid solution or alkali solution. Therefore, increasing the solubility of platinum in the solution is a crucial factor in increasing the efficiency of producing chloroplatinic acid and chloroplatinate salts.

As shown in FIG. 8, there are three conventional methods for preparing chloroplatinic acid. Kauffman, G. B. proposes the first method for the production of a chloroplatinic acid. The first method is that the metal platinum is dissolved and oxidized in excess aqua regia, which is a mixture of concentrated nitric acid (conc. $HNO_3$) and concentrated hydrochloric acid (conc. HCl) in a volume ratio of 1 to 3. The reaction is presented by Equation 1 (Eq. 1). However, this reaction has to be performed at 170° C. to190° C., and after the completion of the reaction, several portions of concentrated hydrochloric acid need to be repeatedly added and heated to 150° C. until no brown gas of nitrogen oxides evolve. As a result, this method uses very hazardous aqua regia and generates a large amount of toxic nitrogen oxide gases which would pollute the working environment during this process.

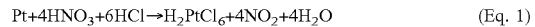

$$Pt+4HNO_3+6HCl \rightarrow H_2PtCl_6+4NO_2+4H_2O \qquad \text{(Eq. 1)}$$

As shown in FIG. 8, China patent publication CN103288147A discloses the second method for the production of a chloroplatinic acid. The second method uses the saturated chlorine gas as the oxidizing agent in a concentrated hydrochloric acid, and the reaction is presented by Equation 2.

$$2Pt+4Cl_2+4HCl \rightarrow 2H_2PtCl_6 \qquad \text{(Eq. 2)}$$

However, since the chlorine gas is a highly toxic and hazardous chemical, the use of chlorine gas has to follow the regulation and be monitored by the related agencies of government. In addition, the chlorine gas should be stored and operated in a sealed equipment to prevent gas leakage, thus resulting in high cost of investment.

As shown in FIG. 8, the third method for the production of a chloroplatinic acid uses a hydrogen peroxide ($H_2O_2$) as the oxidizing agent while hydrogen chloride is bubbled through to agitate the platinum granules, and the reaction is presented by Equation 3.

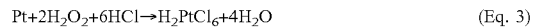

$$Pt+2H_2O_2+6HCl \rightarrow H_2PtCl_6+4H_2O \qquad \text{(Eq. 3)}$$

To undergo an efficient production process, platinum black, the fine powders manufactured from molten ammonium hexachloroplatinate, is needed to add into a relatively high concentration of $H_2O_2$ (30 wt %) aqueous solution; the flow of the hydrochloride gas should be properly controlled during the process. Moreover, excess amounts of hydrogen peroxide and concentrated hydrochloride are required to compensate their loss during the reaction at high temperature (>75° C.). Besides, the hydrogen peroxide at high concentration in this reaction is susceptible to a thermal decomposition. One must take precaution for the potential hazard of explosion on handling the hydrogen peroxide to produce the chloroplatinic acid.

Nowadays with the developing trend towards higher environmental concern and stricter safety requirements, the conventional methods for producing the chloroplatinic acid are bound to stop due to various shortcomings such as complicated process, safety hazards, high time-consumption, high cost or environmental unfriendliness.

Further, as shown in FIG. 8, the production of a potassium hexachloroplatinate should add a potassium salt such as potassium chloride (KCl), potassium hydroxide (KOH), and potassium carbonate ($K_2CO_3$), into a prior prepared chloroplatinic acid solution to form a mixture, followed by evaporation of solvent, cooling, crystallization, and drying, so as to give orange crystals. The reactions are presented in Equations 4, 5 and 6.

$$H_2PtCl_6+2KCl \rightarrow K_2PtCl_6+2HCl \qquad \text{(Eq. 4)}$$

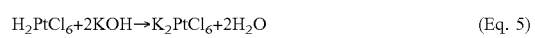
$$H_2PtCl_6+2KOH \rightarrow K_2PtCl_6+2H_2O \qquad \text{(Eq. 5)}$$

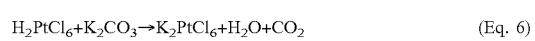
$$H_2PtCl_6+K_2CO_3 \rightarrow K_2PtCl_6+H_2O+CO_2 \qquad \text{(Eq. 6)}$$

Take using KCl to produce $K_2PtCl_6$ for example: first, an aqueous solution of a chloroplatinic acid is prepared, and KCl is added to form a mixed solution. The mixed solution is stirred at room temperature for 1 hour to 2 hours to obtain yellow precipitate, and the yellow precipitate is filtered, rinsed with deionized water, and dried at 70° C. to 90° C. under reduced pressure to obtain an orange $K_2PtCl_6$ crystal.

As shown in FIG. 8, a method for producing $Na_2PtCl_6$ is similar to the above-mentioned method for producing $K_2PtCl_6$. Sodium chloride (NaCl) or sodium hydroxide (NaOH) is added to an aqueous chloroplatinic acid solution, and a sequence of heating, cooling, crystallization, and drying processes are followed to produce an orange $Na_2PtCl_6$ crystal. The reactions are presented in Equations 7 and 8.

$$H_2PtCl_6 + 2NaCl \rightarrow Na_2PtCl_6 + 2HCl \quad (Eq. 7)$$

$$H_2PtCl_6 + 2NaOH \rightarrow Na_2PtCl_6 + 2H_2O \quad (Eq. 8)$$

Ammonium hexachloroplatinate is a soluble platinum(IV) salt that is not hygroscopic. As shown in FIG. 8, an ammonium hexachloroplatinate is generally prepared by adding ammonium chloride ($NH_4Cl$) to an aqueous chloroplatinic acid solution, followed by a sequence of heating, cooling, crystallization, and drying processes. Finally, a yellow $(NH_4)_2PtCl_6$ crystal is obtained. The reaction is presented in Equation 9.

$$H_2PtCl_6 + 2NH_4Cl \rightarrow (NH_4)_2PtCl_6 + 2HCl \quad (Eq. 9)$$

Since the above-mentioned method for producing the $Na_2PtCl_6$, $K_2PtCl_6$ and $(NH_4)_2PtCl_6$ requires the use of the prepared chloroplatinic acid as a starting material, the above-mentioned method for producing the chloroplatinate salts cannot avoid the existing drawbacks of making the chloroplatinic acid, such as being hazardous and environmentally harmful, so the conventional methods are unfavorable for large-scale production.

SUMMARY OF THE DISCLOSURE

In view that the conventional method cannot make chloroplatinic acid or chloroplatinate safely and efficiently, an objective of the instant disclosure is to avoid using chlorine gas, aqua regia or hydrogen peroxide in the process and thus provide an improved safe and environment-friendly method of making an inorganic platinum compound. The method of the instant disclosure is also beneficial for mass production and has the higher potential for commercial implementation.

Another objective of the instant disclosure is to provide a method of making an inorganic platinum compound which has advantages of high yield, simplicity, time-effectiveness, and cost-effectiveness.

To achieve the foresaid objectives, the instant disclosure provides a method of making an inorganic platinum compound including Steps (A) and (B). In Step (A): a platinum material and a halogen-containing oxidizing agent are provided; and in Step (B): the platinum material is treated with the halogen-containing oxidizing agent in a hydrochloric acid aqueous solution to obtain an inorganic platinum compound; wherein the halogen-containing oxidizing agent excludes chlorine gas, and the inorganic platinum compound comprises chloroplatinic acid or chloroplatinate salt.

By means of oxidizing the platinum material with the specific halogen-containing oxidizing agent in the hydrochloric acid aqueous solution, the risk of explosion owing to using hydrogen peroxide as an oxidizing agent can be eliminated, and the following procedure to deal with toxic gases, such as nitrogen oxides or chlorine gas, is no more necessary. Therefore, the instant disclosure can effectively simplify the process, and have the advantages of simplicity, safety, time-effectiveness, low cost, environment-friendliness and high yield.

In accordance with the instant disclosure, an oxidation reaction in Step (B) can be carried out within a suitable temperature range, and there is no particular limitation on the temperature condition. In some cases, the temperature of Step (B) ranges from −10° C. to 100° C. Furthermore, in view of implementation in a place where the process conditions should be limited, for example, a pharmaceutical factory usually limits the pressure of the reaction in glass tanks to less than 2 kg/cm², preferably, the temperature in Step (B) ranges from greater than or equal to 4° C. to less than 15° C. When Step (B) is carried out at a lower temperature, the stability of the halogen oxidant is improved, the gas is less likely to be generated during the reaction, and the loss of the halogen oxidant can be reduced. Even if there is gas existing, the gas is more soluble in the reaction solution at the lower temperature. Therefore, the overall pressure of the reaction tank is not significantly increased, so the instant disclosure is particularly suitable for a processing environment that requires limited conditions on pressure or exhaust emissions. Accordingly, the instant disclosure can avoid being carried out in a high temperature environment which is the necessary condition for the conventional methods, thereby having the advantages of saving energy, reducing cost, and improving safety in the process.

In some embodiments, Step (B) may comprise Steps (b1) and (b2). In Step (b1), the platinum material is treated with the halogen-containing oxidizing agent in the hydrochloric acid aqueous solution to obtain a solution which comprises the inorganic platinum compound, and in Step (b2), the solution comprising the inorganic platinum compound undergoes a concentration step to obtain the inorganic platinum compound. Specifically, the reaction can be carried out with stirring until the platinum material [Pt(0)] is completely dissolved and oxidized into a stable platinum ion [Pt(IV)] in Step (b1). In addition, the concentration step of Step (b2) may be an evaporation concentration method in which a solvent is evaporated from a solution by heating, a freeze concentration method in which a solvent is removed by freezing, or a vacuum concentration method in which the solvent is volatilized by reducing the pressure, but it is not limited thereto.

Preferably, the concentration step of Step (b2) may adopt rotary heating evaporation to remove water in the solution, wherein the evaporation is performed at a temperature ranging from 50° C. to 100° C. and under a pressure ranging from 0.1 mbar to 1.0 mbar.

Preferably, Step (b2) may comprise Steps (b2-1) and (b2-2). In Step (b2-1), the solution comprising the inorganic platinum compound is concentrated at a temperature ranging from 30° C. to 100° C. to obtain a concentrated solution; and in Step (b2-2), the concentrated solution is placed at a temperature ranging from 0° C. to 30° C. to obtain the inorganic platinum compound in a crystalline state. The inorganic platinum compound in a crystalline state is conducive to storage and commercial applications.

In accordance with the instant disclosure, the halogen-containing oxidizing agent is selected from the group consisting of: a halogen oxoacid (referred to as $HXO_n$), a halogen oxoacid salt (referred to as $MXO_n$), a halogen oxide (referred to as $X_pO_q$), and any combination thereof. Said halogen (X) of various halogen-containing oxidizing agents is Cl, Br, or I, M is K, Na or $NH_4$, wherein n is an integer 1, 2, 3 or 4, p is an integer 1 or 2; and q is an integer 1, 2, 3, or 5.

The chloroplatinate salt will be obtained when the halogen oxidizing agent is the halogen oxyacid salt. For example, when the halogen oxyacid salt is a sodium salt of halogen oxychloride, a sodium chloroplatinate will be obtained; when the halogen oxyacid salt is a potassium salt of halogen oxyacid, a potassium chloroplatinate will be obtained; and when the halogen oxyacid salt is an ammonium salt of halogen oxyacid, ammonium chloroplatinate will be obtained.

Accordingly, when the instant disclosure chooses the halogen oxyacid salt to make the chloroplatinate salt, it is simpler than the conventional method since the instant disclosure is under one pot reaction in a single reaction tank, so the instant disclosure effectively simplifies the process of making the chloroplatinate salt.

In certain embodiments, the halogen oxyacid may comprise: hypochlorous acid (HClO), chlorous acid (HClO$_2$), chloric acid (HClO$_3$), perchloric acid (HClO$_4$), hypobromous acid (HBrO), bromous acid (HBrO$_2$), bromic acid (HBrO$_3$), hypoiodous acid (HIO), iodic acid (HIO$_3$), or periodic acid (HIO$_4$).

In certain embodiments, the halogen oxyacid salt may comprise: sodium hypochlorite (NaClO), potassium hypochlorite (KClO), sodium chlorite (NaClO$_2$), potassium chlorite (KClO$_2$), sodium chlorate (NaClO$_3$), potassium chlorate (KClO$_3$), sodium perchlorate (NaClO$_4$), potassium perchlorate (KClO$_4$), ammonium perchlorate [(NH$_4$)ClO$_4$], sodium hypobromite (NaBrO), potassium hypobromite (KBrO), sodium bromite (NaBrO$_2$), potassium bromite (KBrO$_2$), sodium bromate (NaBrO$_3$), potassium bromate (KBrO$_3$), sodium hypoiodite (NaIO), potassium hypoiodite (KIO), sodium iodate (NaIO$_3$), potassium iodate (KIO$_3$), ammonium iodate (NH$_4$IO$_3$), sodium periodate (NaIO$_4$), or potassium periodate (KIO$_4$).

Preferably, when the halogen-containing oxidizing agent is a chlorite salt such as NaClO$_2$ and KClO$_2$, the reaction can be done not only without chlorine gas at the beginning, but also without chlorine gas generated during the reaction process in Step (B).

In certain embodiments, the halogen oxide may comprise: dichlorine monoxide (Cl$_2$O), dichlorine trioxide (Cl$_2$O$_3$), chlorine dioxide (ClO$_2$), dibromine monoxide (Br$_2$O), dibromine trioxide (Br$_2$O$_3$), bromine dioxide (BrO$_2$), dibromine pentoxide (Br$_2$O$_5$), diiodine monoxide (I$_2$O), or diiodine pentoxide (I$_2$O$_5$).

Preferably, when the halogen-containing oxidizing agent is Cl$_2$O$_3$, Br$_2$O, Br$_2$O$_3$, BrO$_2$, Br$_2$O$_5$, I$_2$O, or I$_2$O$_5$, the halogen-containing oxidizing agent has a greater specific gravity, so the halogen-containing oxidizing agent is less volatile in aqueous solutions, thereby making the reaction react more completely. Thus, the solubility of the platinum material can be enhanced.

In certain embodiments, Cl$_2$O exists in an equilibrium with HClO in water. The reaction is presented in Equation 10.

$$Cl_2O+H_2O \rightleftharpoons 2HOCl \quad (Eq. 10)$$

In certain embodiments, ClO$_2$ is prepared from sodium chlorite or potassium chlorite according to Equations 11, 12 or 13 wherein M is Na or K.

$$5MClO_2+4HCl \rightarrow 4ClO_2+5MCl+2H_2O \quad (Eq. 11)$$

$$8MClO_2+4H_2SO_4 \rightarrow 4ClO_2+2HClO_3+4M_2SO_4+2H_2O+2HCl \quad (Eq. 12)$$

$$2MClO_2+MOCl+2HCl \rightarrow 2ClO_2+3MCl+H_2O \quad (Eq. 13)$$

In certain embodiments, Cl$_2$O$_3$, considered as the anhydride from two molecules of HClO$_2$, is produced by photolysis of ClO$_2$.

In certain embodiments, Br$_2$O is prepared from bromine and mercuric oxide. The reaction is presented in Equation 14.

$$2Br_2+HgO \rightarrow Br_2O+HgBr_2 \quad (Eq. 14)$$

In certain embodiments, the reaction of bromine gas with ozone gives BrO$_2$, Br$_2$O$_3$ or Br$_2$O$_5$ depending on the stoichiometry. The reactions are presented in Equations 15, 16, and 17.

$$Br_2+2O_3 \rightarrow 2BrO_2+O_2 \quad (Eq. 15)$$

$$Br_2+O_3 \rightarrow Br_2O_3 \quad (Eq. 16)$$

$$Br_2+O_3+O_2 \rightarrow Br_2O_5 \quad (Eq. 17)$$

In certain embodiments, I$_2$O is prepared from iodine and mercuric oxide. The reaction is presented in Equation 18.

$$2I_2+HgO \rightarrow I_2O+HgI_2 \quad (Eq. 18)$$

In certain embodiments, I$_2$O$_5$ is prepared by dehydrating HIO$_3$ as shown in Equation 19.

$$2HIO_3 \rightarrow I_2O_5+H_2O \quad (Eq. 19)$$

In certain embodiments, the halogen-containing oxidizing agent can comprise two or more types; for example, both one halogen oxoacid and one halogen oxoacid salt are used as the halogen-containing oxidizing agent, both one halogen oxoacid and one halogen oxide are used as the halogen-containing oxidizing agent, or both one halogen oxoacid salt and one halogen oxide are used as the halogen-containing oxidizing agent, but it is not limited to. The oxidation rate of platinum can be tuned by a combined use of the oxidizing agents of different types.

In certain embodiments, the halogen-containing oxidizing agent can comprise two or more species of the same type; for example, both two species of the halogen oxoacids are used as the halogen-containing oxidizing agent, both two species of the halogen oxoacid salts are used as the halogen-containing oxidizing agent, or two species of the halogen oxide are used as the halogen-containing oxidizing agent, but it is not limited to. The oxidation rate of platinum can be tuned by a combined use of the oxidizing agents of different species of the same type.

Preferably, the platinum material is added into the hydrochloric acid aqueous solution in a form of powder. More preferably, the platinum material has a purity of 99.9%.

In accordance with the instant disclosure, the halogen-containing oxidizing agent can be added into the hydrochloric acid aqueous solution in a form of a solid, a liquid, or an aqueous solution. The aqueous solution is composed of the halogen-containing oxidizing agent as a solute and water as a solvent.

In certain embodiments, the halogen-containing oxidizing agent is added into the hydrochloric acid aqueous solution in a form of the aqueous solution which is composed of the halogen-containing oxidizing agent and the water. Preferably, the water is distilled water or deionized water, but it is not limited thereto. Preferably, a weight ratio of the halogen-containing oxidizing agent to the water ranges from 1:1 to 1:200.

In certain embodiments, in Step (A), relative to per gram of the platinum material, a usage of the aqueous solution composed of the halogen-containing oxidizing agent and the water ranges from 1 mL to 1000 mL.

In certain embodiments, in Step (B), based on the total weight of the hydrochloric acid aqueous solution, the hydrochloric acid aqueous solution contains 18 wt % to 37 wt % of hydrochloric acid. Specifically, the hydrochloric acid aqueous solution is an industrial grade hydrochloric acid with the concentration of 37 wt % or an electronic grade hydrochloric acid with the concentration of 37 wt %.

In certain embodiments, in Step (B), a volume ratio of the aqueous solution composed of the halogen-containing oxidizing agent and the water to the hydrochloric acid aqueous solution ranges from 1:1 to 1:50.

In certain embodiments, in Step (B), a molar ratio of the halogen-containing oxidizing agent to the hydrochloric acid ranges from 1:1 to 1:500. Due to the chemical properties of the halogen and an equivalent ratio of the reactants, even if the halogen of the halogen-containing oxidizing agent is bromine or iodine, such as the iodic acid, the potassium iodate, or the sodium periodate, the chloroplatinic acid or the chloroplatinate salts still can be obtained in a high yield.

In accordance with the instant disclosure, the inorganic platinum compound may be characterized by the ultraviolet-visible (UV-Vis) spectral absorption because the wavelength at absorption maximum (λmax) of one material has its own specific range.

Specifically, the $\lambda_{max}$ of the chloroplatinic acid ranges from 260 nm to 262 nm; the $\lambda_{max}$ of the sodium chloroplatinate ranges from 262 nm to 263 nm; and the $\lambda_{max}$ of the potassium chloroplatinate ranges from 262 nm to 263 nm.

In accordance with the instant disclosure, the inorganic platinum compound may be characterized by a result of a thermal gravimetric analysis (TGA).

In this specification, where a range of values is provided, it is understood that each intervening value, to the tenth of the unit of the lower limit unless the context clearly dictates otherwise, between the upper and lower limits of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention pertains. Although any methods and materials similar or equivalent to those described herein can be used in the practice or testing of the present invention, the preferred methods and materials are now described. All publications mentioned hereunder are incorporated herein by reference. Unless mentioned otherwise, the techniques employed herein are standard methodologies well known to one of ordinary skill in the art.

It must be noted that as used herein and in the appended claims, the singular forms "a," "an," and "the" include plural referents unless the context clearly dictates otherwise.

It is further noted that the claims may be drafted to exclude any optional element.

Other objectives, advantages and novel features of the disclosure will become more apparent from the following detailed description when taken in conjunction with the accompanying drawings.

DETAILED DESCRIPTION OF THE DISCLOSURE

Hereinafter, one skilled in the art can easily realize the advantages and effects of the instant disclosure from the following examples. Therefore, it should be understood that the descriptions proposed herein are just preferable examples for the purpose of illustrations only, not intended to limit the scope of the disclosure. Various modifications and variations could be made in order to practice or apply the instant disclosure without departing from the spirit and scope of the disclosure.

Figure 1:
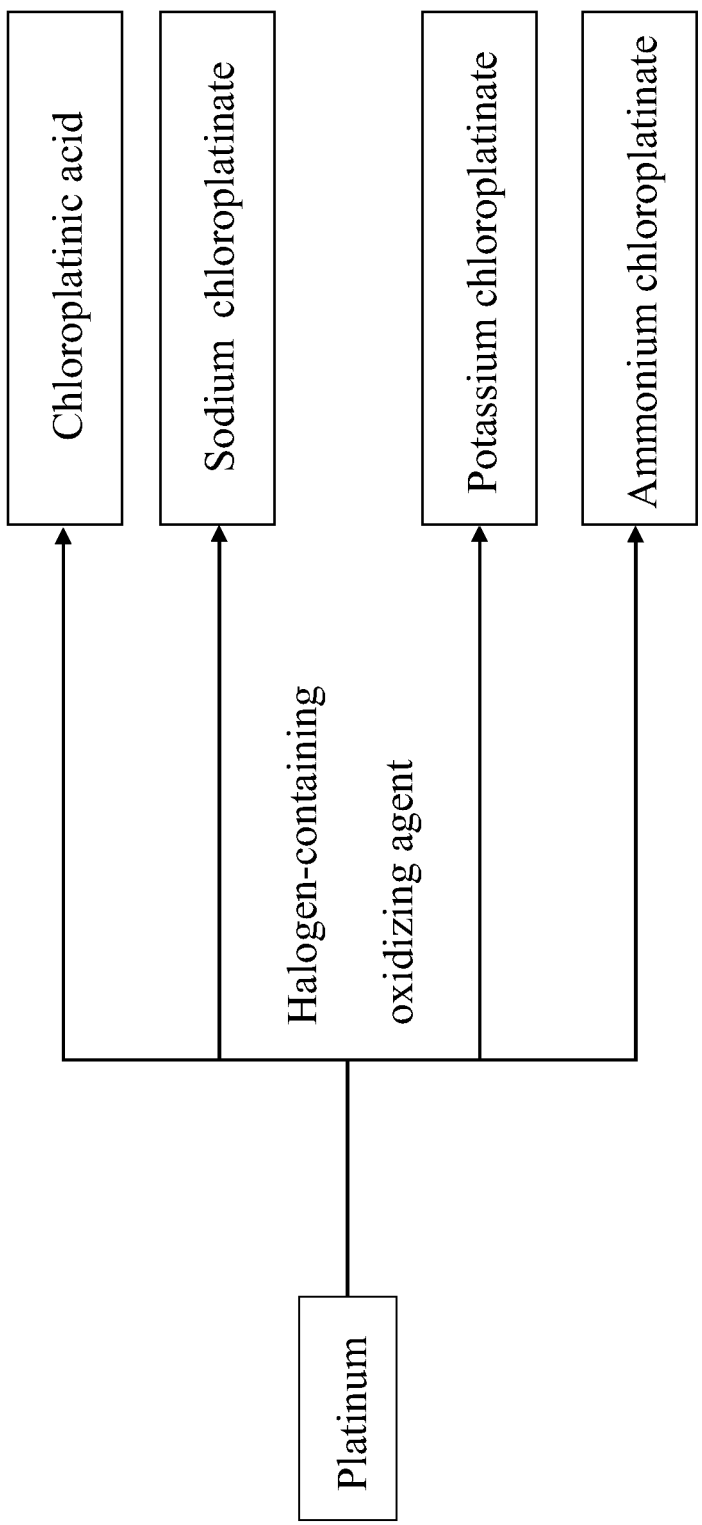
FIG. 1 is a schematic flow diagram illustrating the method of making an inorganic platinum compound in accordance with the instant disclosure.

With reference to FIG. 1, a method of making an inorganic platinum compound of the instant disclosure uses the halogen-containing oxidizing agent to oxidize the platinum material, wherein the inorganic platinum compound is the chloroplatinic acid, sodium chloroplatinate, potassium chloroplatinate, or ammonium chloroplatinate. The method of making an inorganic platinum compound is a single step reaction, and it can be performed in a single reactor without isolating an intermediate product.

In the following Examples and Comparative Examples, Ultraviolet-visible (UV-Vis) spectra were measured on Agilent Technologies Cary60 UV-Vis spectrophotometer. TGA spectra were performed on Mettler Toledo TGA/DSC 3+ instrument. ICP-OES for analyses of the proportion of platinum in the inorganic platinum compounds were performed on Perkin Elmer optima 8X00 spectrometer. Rotary evaporation in Step (B) was performed on IKA RV10 rotary evaporator. All the reagents were reagent grade purchased from Acros Organics and were used without further purification. Platinum powder was in 99.9% purity. Water is distilled or deionized for use as a solvent.

COMPARATIVE EXAMPLE 1

Synthesis of Chloroplatinic Acid by Using Aqua Regia in HCl

Platinum powders (30 mg) and aqua regia (3.5 mL of aqueous solution containing 37 wt % hydrochloric acid and 68 wt % nitric acid) were placed in a 10 mL flat-bottomed flask to form a reaction mixture. The reaction mixture was stirred at room temperature for over 6 hours until all the platinum powders were consumed to give a solution containing chloroplatinic acid. After completion of the reaction, 37 wt % hydrochloric acid was added into the solution containing chloroplatinic acid and heated at 100° C. to remove nitrogen oxides. This process of heating with adding the concentrated hydrochloric acid was repeated for several times until no brown gas of nitrogen oxides evolved. The solution was then subjected to rotary evaporation at 100° C. under reduced pressure (0.5 mbar) to concentrate the solution, followed by a stand at room temperature to obtain 79.6 mg of crystals of the chloroplatinic acid in the hexahydrate form. The yield was over 99%.

COMPARATIVE EXAMPLE 2

Two-Step Synthesis of Potassium Chloroplatinate by Using Aqua Regia, Followed by Addition of Potassium Chloride First step: Platinum powders (30 mg) and aqua regia (3.5 mL of aqueous solution containing 37 wt % hydrochloric acid and 68 wt % nitric acid) were placed in a 10 mL flat-bottomed flask to form a reaction mixture. The reaction mixture was stirred and heated at 50° C. to 60° C. for 10 minutes until all platinum powders were consumed to give a solution containing chloroplatinic acid. After completion of the reaction, 37 wt % hydrochloric acid was repeatedly added into the solution containing chloroplatinic acid and heated at 100° C. until no brown gas of nitrogen oxides evolved. The solution was then concentrated by rotary evaporation at 100° C. under reduced pressure (0.5 mbar), followed by a stand at room temperature to obtain crystals of the chloroplatinic acid hexahydrate.

Second step: The said chloroplatinic acid and 5 mL of 10 wt % aqueous potassium chloride solution were placed in a flat-bottomed flask, and then stirred at room temperature for 2 hours to complete the reaction, giving a product solution containing a yellow precipitate of potassium chloroplatinate. After filtration and drying, 90.6 mg of orange crystals of potassium chloroplatinate was obtained. The yield was over 99%.

EXAMPLE 1

Synthesis of Chloroplatinic Acid by Using Iodic Acid ($HIO_3$) and Perchloric Acid ($HClO_4$)

Platinum powders (30 mg) and 2.5 mL of concentrated hydrochloric acid aqueous solution containing 37 wt % of HCl were placed in a 10 mL flat-bottomed flask. Then, 1 mL of aqueous solution composed of the halogen-containing oxidizing agent and water was added into the flask to obtain a reaction mixture. The halogen-containing oxidizing agent contained 60 mg of $HIO_3$ and 50 μL of 70 wt % $HClO_4$, wherein a weight ratio of the gross weight of $HIO_3$ and $HClO_4$ to the water was 1:10.5. In the reaction mixture, a molar ratio of the halogen-containing oxidizing agent to HCl was 1:25.6. The reaction mixture was stirred and heated at 50° C. to 60° C. for 10 minutes until all platinum powders were consumed to obtain a Solution 1 containing the chloroplatinic acid. Solution 1 was then concentrated by rotary evaporation at 100° C. under a reduced pressure (0.5 mbar), followed by a stand at room temperature to obtain 79.3 mg of crystals of the chloroplatinic acid hexahydrate. The yield was over 99%.

Figure 2:
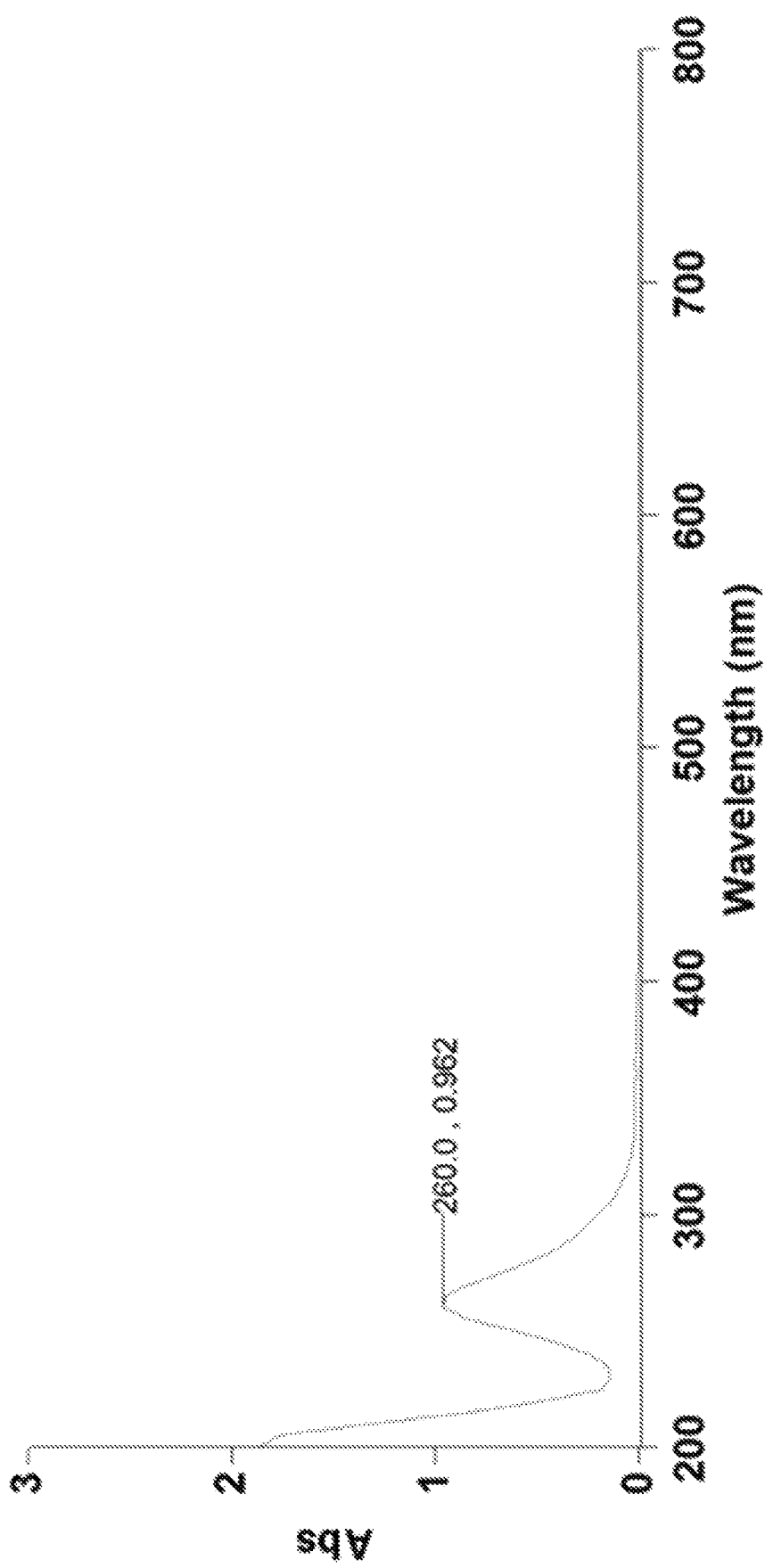
FIG. 2 is a UV-Vis spectrum of the chloroplatinic acid obtained in Example 1 in 0.1 M $HCl_{(aq)}$.
Figure 5:
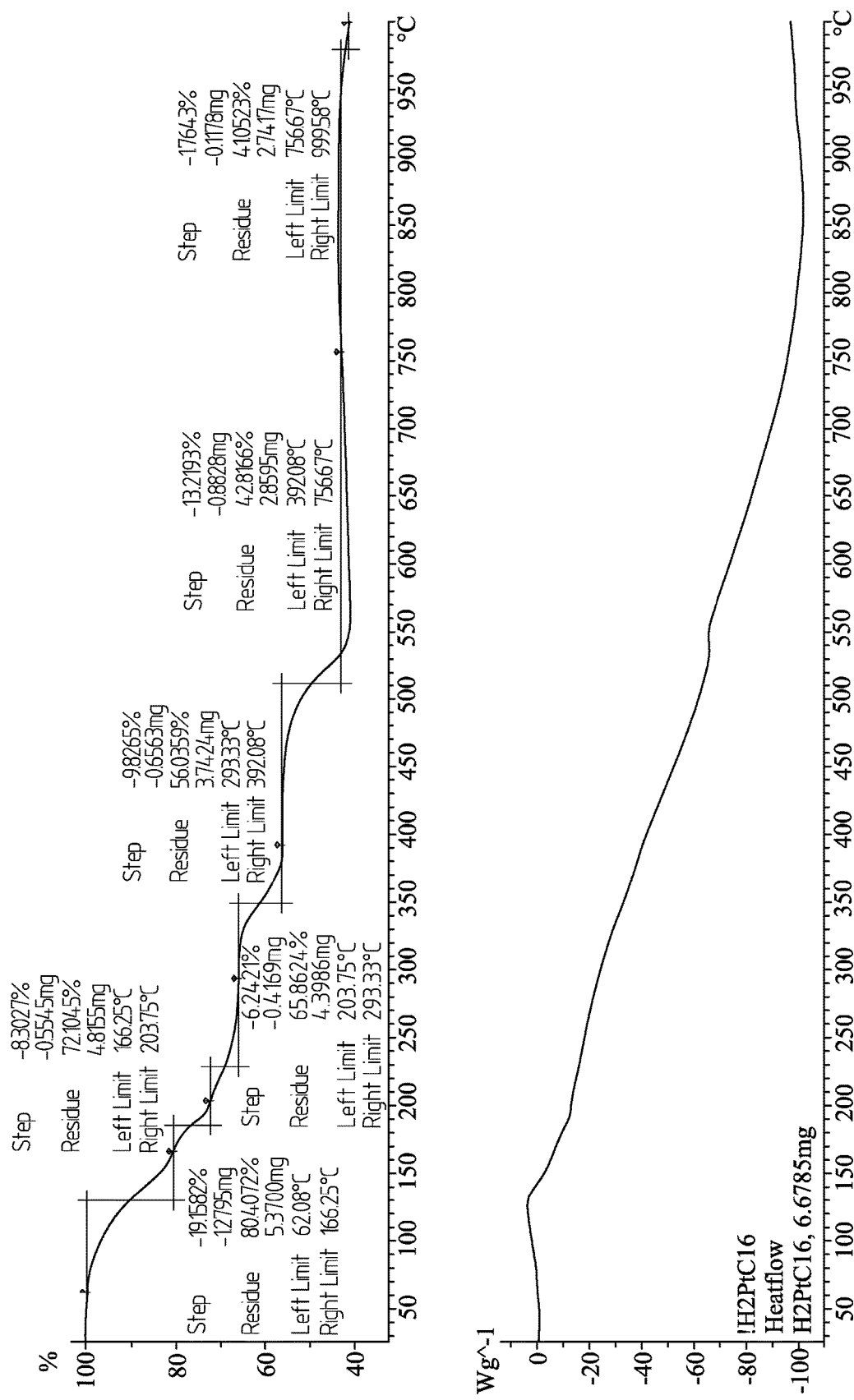
FIG. 5 is a TGA curve diagram of the chloroplatinic acid obtained in Example 1.

Additionally, 4.3 mg of the crystal of the chloroplatinic acid hexahydrate was dissolved in 0.1 M hydrochloric acid aqueous solution. As shown in FIG. 2, its $\lambda_{max}$ of the UV-Vis spectrum was at 260 nm. Moreover, 6.6785 mg of the crystal of the chloroplatinic acid hexahydrate was measured by TGA, and the obtained TGA curve diagram was shown in FIG. 5. Furthermore, 8.7 mg of the crystal of the chloroplatinic acid hexahydrate was dissolved in 10.6614 g pure water, and then diluted 10 times and measured by ICP-OES. The measured result was 28.36 ppm, so the content of platinum in the chloroplatinic acid hexahydrate was about 37.67 wt %.

EXAMPLE 2

Synthesis of Sodium Chloroplatinate by Using Sodium Chlorite ($NaClO_2$) and Sodium Chlorate ($NaClO_3$)

Platinum powders (30 mg) and 2.5 mL of concentrated hydrochloric acid aqueous solution containing 37 wt % of HCl were placed in a 10 mL flat-bottomed flask. Then, 1 mL of aqueous solution composed of the halogen-containing oxidizing agent and water was added into the flask to obtain a reaction mixture. The halogen-containing oxidizing agent contained 20 mg of $NaClO_2$ and 60 mg of $NaClO_3$, wherein a weight ratio of the gross weight of $NaClO_2$ and $NaClO_3$ to the water was 1:12.5. In the reaction mixture, a molar ratio of the halogen-containing oxidizing agent to HCl was 1:38.3. The reaction mixture was stirred and heated at 50° C. to 60° C. for 10 minutes until all platinum powders were consumed to obtain a Solution 2 containing the sodium chloroplatinate. Solution 2 was then concentrated by rotary evaporation at 100° C. under a reduced pressure (0.5 mbar), followed by a stand at room temperature to obtain crystals of the sodium chloroplatinate. The yield was over 99%.

Figure 3:
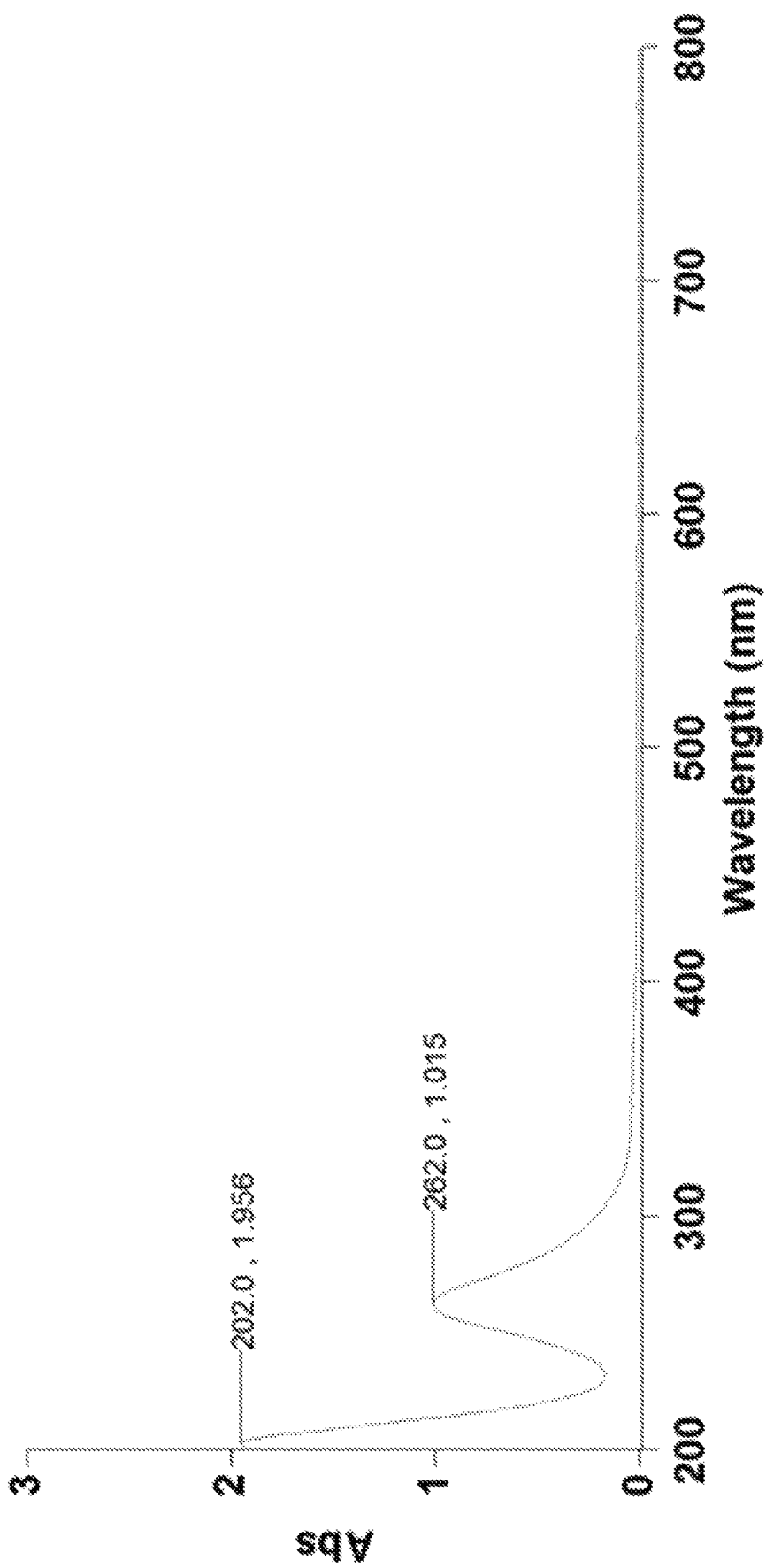
FIG. 3 is a UV-Vis spectrum of the sodium chloroplatinate obtained in Example 2 in 0.1 M $HCl_{(aq)}$.
Figure 6:
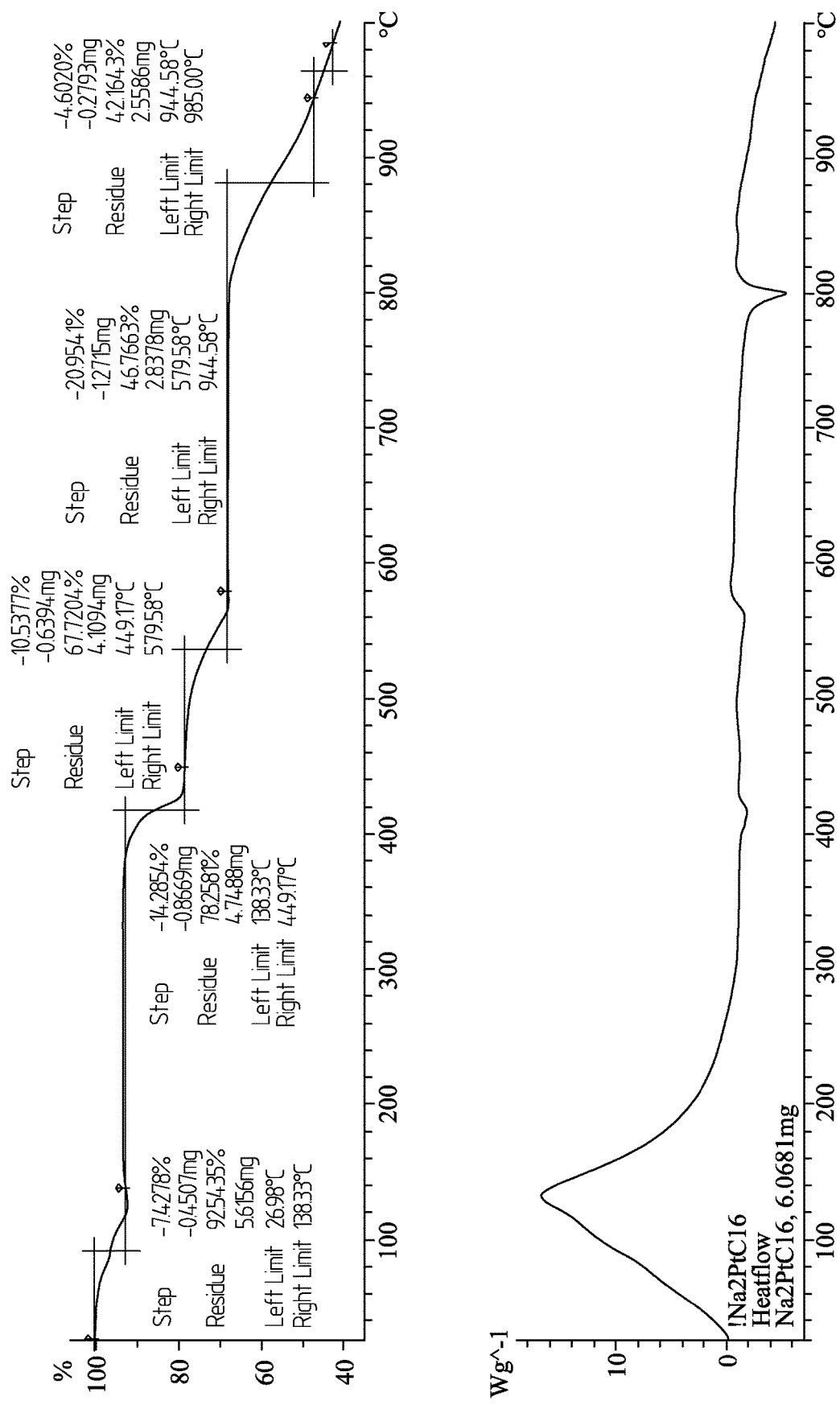
FIG. 6 is a TGA curve diagram of the sodium chloroplatinate obtained in Example 2.

Additionally, 4.8 mg of the crystal of the sodium chloroplatinate was dissolved in 0.1 M hydrochloric acid aqueous solution. As shown in FIG. 3, its $\lambda_{max}$ of the UV-Vis spectrum was at 262.0 nm. Moreover, 6.0681 mg of the crystal of the sodium chloroplatinate was measured by TGA, and the obtained TGA curve diagram was shown in FIG. 6.

EXAMPLE 3

Synthesis of Sodium Chloroplatinate by Using Sodium Chlorite ($NaClO_2$) and Sodium Perchlorate ($NaClO_4$)

Platinum powders (30 mg) and 2.5 mL of concentrated hydrochloric acid aqueous solution containing 37 wt % of HCl were placed in a 10 mL flat-bottomed flask. Then, 1 mL of aqueous solution composed of the halogen-containing oxidizing agent and water was added into the flask to obtain a reaction mixture. The halogen-containing oxidizing agent contained 40 mg of $NaClO_2$ and 60 mg of $NaClO_4$, wherein a weight ratio of the gross weight of $NaClO_2$ and $NaClO_4$ to the water was 1:10. In the reaction mixture, a molar ratio of the halogen-containing oxidizing agent to HCl was 1:32.2. The reaction mixture was stirred and heated at 50° C. to 60° C. for 10 minutes until all platinum powders were consumed to obtain a Solution 3 containing the sodium chloroplatinate. Solution 3 was then concentrated by rotary evaporation at 100° C. under a reduced pressure (0.5 mbar), followed by a stand at room temperature to obtain crystals of the sodium chloroplatinate. The yield was over 99%.

EXAMPLE 4

Synthesis of Sodium Chloroplatinate by Using Sodium Chlorite ($NaClO_2$) at Low Temperature Platinum powders (30 mg) and 2.5 mL of concentrated hydrochloric acid aqueous solution containing 37 wt % of HCl were placed in a 10 mL flat-bottomed flask. Then, 1 mL of aqueous solution composed of the halogen-containing oxidizing agent and water was added into the flask to obtain a reaction mixture. The halogen-containing oxidizing agent contained 100 mg of $NaClO_2$, wherein a weight ratio of $NaClO_2$ to the water was 1:10. In the reaction mixture, a molar ratio of the halogen-containing oxidizing agent to HCl was 1:26.9. The reaction mixture was stirred and cooled at 4° C. for 40 minutes until all platinum powders were consumed to obtain a Solution 4 containing the sodium chloroplatinate. Solution 4 was then concentrated by rotary evaporation at 100° C. under a reduced pressure (0.5 mbar), followed by a stand at room temperature to obtain crystals of the sodium chloroplatinate. The yield was over 99%.

EXAMPLE 5

Synthesis of Sodium Chloroplatinate by Using Sodium Chlorite ($NaClO_2$)

Platinum powders (30 mg) and 2.5 mL of concentrated hydrochloric acid aqueous solution containing 37 wt % of HCl were placed in a 10 mL flat-bottomed flask. Then, 1 mL of aqueous solution composed of the halogen-containing oxidizing agent and water was added into the flask to obtain a reaction mixture. The halogen-containing oxidizing agent contained 100 mg of $NaClO_2$, wherein a weight ratio of $NaClO_2$ to the water was 1:10. In the reaction mixture, a molar ratio of the halogen-containing oxidizing agent to HCl was 1:26.9. The reaction mixture was stirred and heated at 50° C. to 60° C. for 10 minutes until all platinum powders were consumed to obtain a Solution 5 containing the sodium chloroplatinate. Solution 5 was then concentrated by rotary evaporation at 100° C. under a reduced pressure (0.5 mbar), followed by a stand at room temperature to obtain crystals of the sodium chloroplatinate. The yield was over 99%.

Additionally, the crystal of the sodium chloroplatinate was measured by ICP-OES. The measured result of the content of platinum in the sodium chloroplatinate was about 42.99 wt %.

EXAMPLE 6

Synthesis of Potassium Chloroplatinate by Using Potassium Chlorate ($KClO_3$)

Platinum powders (30 mg) and 2.5 mL of concentrated hydrochloric acid aqueous solution containing 37 wt % of HCl were placed in a 10 mL flat-bottomed flask. Then, 1 mL of aqueous solution composed of the halogen-containing oxidizing agent and water was added into the flask to obtain a reaction mixture. The halogen-containing oxidizing agent contained 100 mg of $KClO_3$, wherein a weight ratio of $KClO_3$ to the water was 1:10. In the reaction mixture, a molar ratio of the halogen-containing oxidizing agent to HCl was 1:36.5. The reaction mixture was stirred and heated at 50° C. to 60° C. for 10 minutes until all platinum powders were consumed to obtain a Solution 6 containing the potassium chloroplatinate. Solution 6 was then concentrated by rotary evaporation at 100° C. under a reduced pressure (0.5 mbar), followed by a stand at room temperature to obtain crystals of the potassium chloroplatinate. The yield was over 99%.

Figure 4:
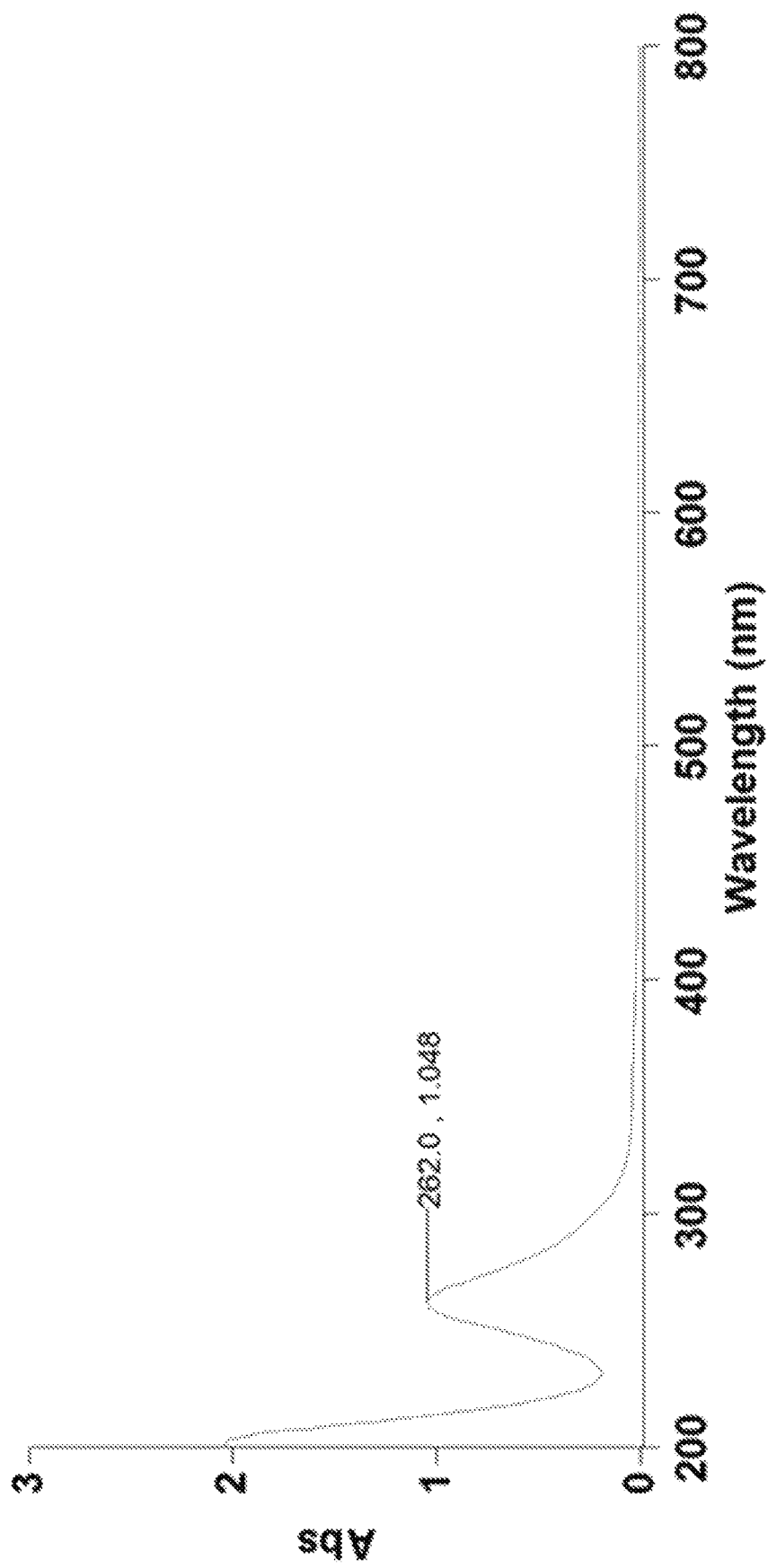
FIG. 4 is a UV-Vis spectrum of the potassium chloroplatinate obtained in Example 6 in 0.1 M $HCl_{(aq)}$.
Figure 7:
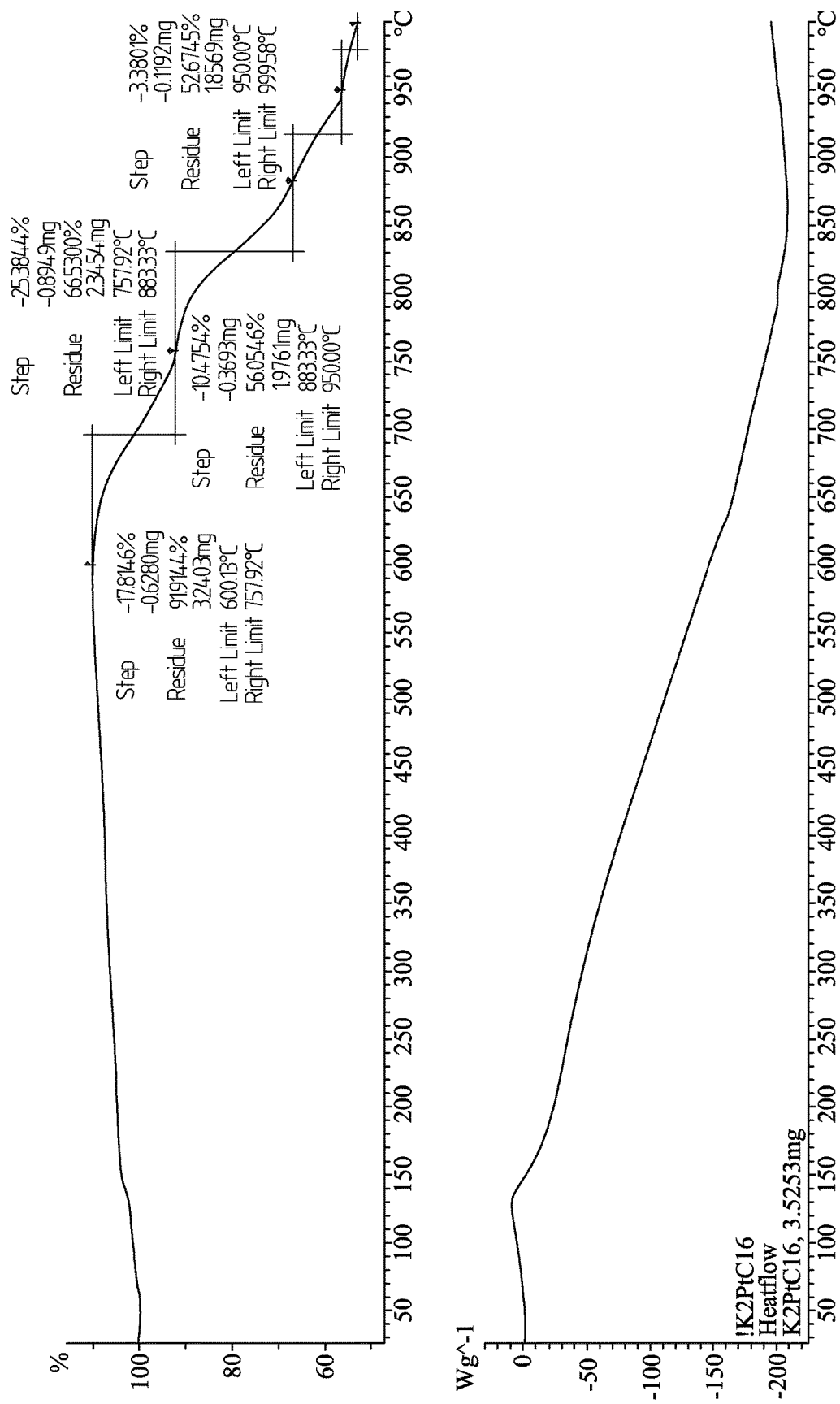
FIG. 7 is a TGA curve diagram of the potassium chloroplatinate obtained in Example 6.
Figure 8:
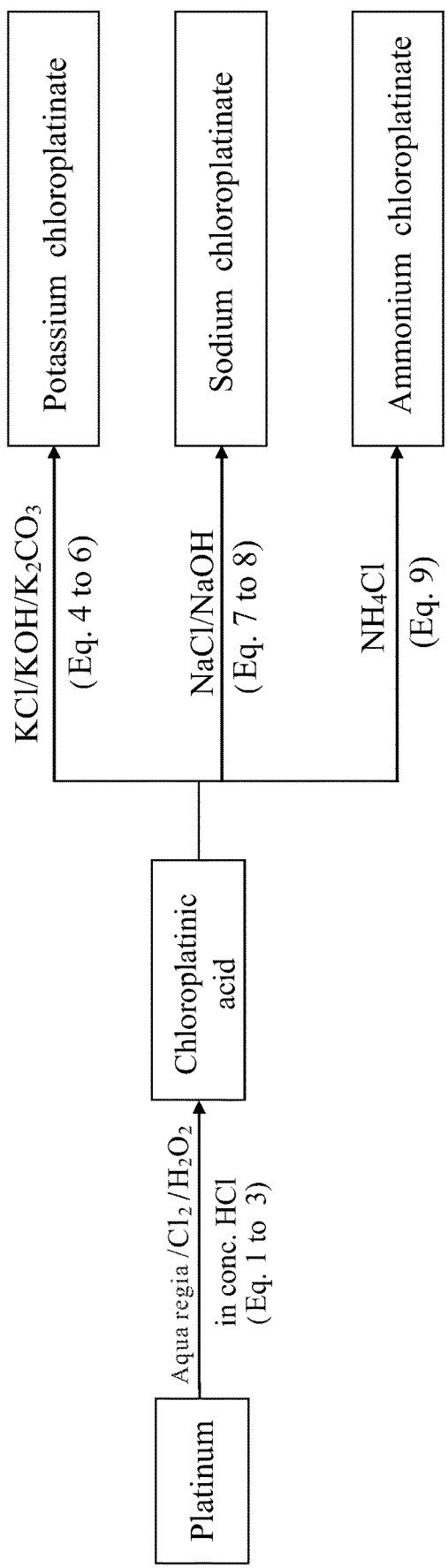
FIG. 8 is a schematic flow diagram illustrating the methods of making an inorganic platinum compound in accordance with the prior art.

Additionally, 5.1 mg of the crystal of the potassium chloroplatinate was dissolved in 0.1 M hydrochloric acid aqueous solution. As shown in FIG. 4, its $\lambda_{max}$ of the UV-Vis spectrum was at 262.0 nm. Moreover, 3.5253 mg of the crystal of the potassium chloroplatinate was measured by TGA, and the obtained TGA curve diagram was shown in FIG. 7. Furthermore, the crystal of the potassium chloroplatinate was measured by ICP-OES. The measured result of the content of platinum in the potassium chloroplatinate was about 40.14 wt %.

EXAMPLE 7

Synthesis of Sodium Chloroplatinate by Using Sodium Chlorate ($NaClO_3$) and Sodium Periodate ($NaIO_4$)

Platinum powders (30 mg) and 2.5 mL of concentrated hydrochloric acid aqueous solution containing 37 wt % of HCl were placed in a 10 mL flat-bottomed flask. Then, 1 mL of aqueous solution composed of the halogen-containing oxidizing agent and water was added into the flask to obtain a reaction mixture. The halogen-containing oxidizing agent contained 50 mg of $NaClO_3$ and 50 mg of $NaIO_4$, wherein a weight ratio of the gross weight of $NaClO_3$ and $NaIO_4$ to the water was 1:10. In the reaction mixture, a molar ratio of the halogen-containing oxidizing agent to HCl was 1:42.7. The reaction mixture was stirred and heated at 50° C. to 60° C. for 10 minutes until all platinum powders were consumed to obtain a Solution 7 containing the sodium chloroplatinate. Solution 7 was then concentrated by rotary evaporation at 100° C. under a reduced pressure (0.5 mbar), followed by a stand at room temperature to obtain crystals of the sodium chloroplatinate. The yield was over 99%.

EXAMPLE 8

Synthesis of Sodium Chloroplatinate by Using Sodium Chlorate ($NaClO_3$) and Perchloric Acid ($HClO_4$)

Platinum powders (30 mg) and 2.5 mL of concentrated hydrochloric acid aqueous solution containing 37 wt % of HCl were placed in a 10 mL flat-bottomed flask. Then, 1 mL of aqueous solution composed of the halogen-containing oxidizing agent and water was added into the flask to obtain a reaction mixture. The halogen-containing oxidizing agent contained 60 mg of $NaClO_3$ and 90 µL of 70 wt % $HClO_4$, wherein a weight ratio of the gross weight of $NaClO_3$ and $HClO_4$ to the water was 1:6.1. In the reaction mixture, a molar ratio of the halogen-containing oxidizing agent to HCl was 1:18.7. The reaction mixture was stirred and heated at 50° C. to 60° C. for 10 minutes until all platinum powders were consumed to obtain a Solution 8 containing the sodium chloroplatinate. Solution 8 was then concentrated by rotary evaporation at 100° C. under a reduced pressure (0.5 mbar), followed by a stand at room temperature to obtain crystals of the sodium chloroplatinate. The yield was over 99%.

EXAMPLE 9

Synthesis of Potassium Chloroplatinate by Using Ootassium Iodate ($KIO_3$) and Potassium Perchlorate ($KClO_4$)

Platinum powders (30 mg) and 2.5 mL of concentrated hydrochloric acid aqueous solution containing 37 wt % of HCl were placed in a 10 mL flat-bottomed flask. Then, 1 mL of aqueous solution composed of the halogen-containing oxidizing agent and water was added into the flask to obtain a reaction mixture. The halogen-containing oxidizing agent contained 70 mg of $KIO_3$ and 30 mg of $KClO_4$, wherein a weight ratio of the gross weight of $KIO_3$ and $KClO_4$ to the water was 1:10. In the reaction mixture, a molar ratio of the halogen-containing oxidizing agent to HCl was 1:54.4. The reaction mixture was stirred and heated at 50° C. to 60° C. for 10 minutes until all platinum powders were consumed to obtain a Solution 9 containing the potassium chloroplatinate.

Solution 9 was then concentrated by rotary evaporation at 100° C. under a reduced pressure (0.5 mbar), followed by a stand at room temperature to obtain crystals of the potassium chloroplatinate. The yield was over 99%.

EXAMPLE 10

Synthesis of Potassium Chloroplatinate by Using Potassium Iodate ($KIO_3$) and Iodic Acid ($HIO_3$)

Platinum powders (30 mg) and 2.5 mL of concentrated hydrochloric acid aqueous solution containing 37 wt % of HCl were placed in a 10 mL flat-bottomed flask. Then, 1 mL of aqueous solution composed of the halogen-containing oxidizing agent and water was added into the flask to obtain a reaction mixture. The halogen-containing oxidizing agent contained 80 mg of $KIO_3$ and 30 mg of $HIO_3$, wherein a weight ratio of the gross weight of $KIO_3$ and $HIO_3$ to the water was 1:9.1. In the reaction mixture, a molar ratio of the halogen-containing oxidizing agent to HCl was 1:55.4. The reaction mixture was stirred and heated at 50° C. to 60° C. for 10 minutes until all platinum powders were consumed to obtain a Solution 10 containing the potassium chloroplatinate. Solution 10 was then concentrated by rotary evaporation at 100° C. under a reduced pressure (0.5 mbar), followed by a stand at room temperature to obtain crystals of the potassium chloroplatinate. The yield was over 99%.

EXAMPLE 11

Synthesis of Potassium Chloroplatinate by Using Potassium Chlorate ($KClO_3$) and Potassium Perchlorate ($KClO_4$)

Platinum powders (30 mg) and 2.5 mL of concentrated hydrochloric acid aqueous solution containing 37 wt % of HCl were placed in a 10 mL flat-bottomed flask. Then, 1 mL of aqueous solution composed of the halogen-containing oxidizing agent and water was added into the flask to obtain a reaction mixture. The halogen-containing oxidizing agent contained 70 mg of KClO3 and 20 mg of $KClO_4$, wherein a weight ratio of the gross weight of $KClO_3$ and $KClO_4$ to the water was 1:11.1. In the reaction mixture, a molar ratio of the halogen-containing oxidizing agent to HCl was 1:58.6. The reaction mixture was stirred and heated at 50° C. to 60° C. for 10 minutes until all platinum powders were consumed to obtain a Solution 11 containing the potassium chloroplatinate. Solution 11 was then concentrated by rotary evaporation at 100° C. under a reduced pressure (0.5 mbar), followed by a stand at room temperature to obtain crystals of the potassium chloroplatinate. The yield was over 99%.

EXAMPLE 12

Synthesis of Sodium Chloroplatinate by Using Perchloric Acid ($HClO_4$) and Potassium Iodate ($KIO_3$)

Platinum powders (30 mg) and 2.5 mL of concentrated hydrochloric acid aqueous solution containing 37 wt % of HCl were placed in a 10 mL flat-bottomed flask. Then, 1 mL of aqueous solution composed of the halogen-containing oxidizing agent and water was added into the flask to obtain a reaction mixture. The halogen-containing oxidizing agent contained 45 µL of 70 wt % $HClO_4$ and 80 mg of $KIO_3$, wherein a weight ratio of the gross weight of $HClO_4$ and $KIO_3$ to the water was 1:7.6. In the reaction mixture, a molar ratio of the halogen-containing oxidizing agent to HCl was 1:33.6. The reaction mixture was stirred and heated at 50° C. to 60° C. for 10 minutes until all platinum powders were consumed to obtain a Solution 12 containing the sodium chloroplatinate. Solution 12 was then concentrated by rotary evaporation at 100° C. under a reduced pressure (0.5 mbar), followed by a stand at room temperature to obtain crystals of the sodium chloroplatinate. The yield was over 99%.

EXAMPLE 13

Synthesis of Potassium Chloroplatinate by Using Iodic Acid ($HIO_3$), Potassium Chlorate ($KClO_3$) and Potassium Perchlorate ($KClO_4$)

Platinum powders (30 mg) and 2.5 mL of concentrated hydrochloric acid aqueous solution containing 37 wt % of HCl were placed in a 10 mL flat-bottomed flask. Then, 1 mL of aqueous solution composed of the halogen-containing oxidizing agent and water was added into the flask to obtain a reaction mixture. The halogen-containing oxidizing agent contained 30 mg of $HIO_3$, 30 mg of $KClO_3$ and 50 mg of $KClO_4$, wherein a weight ratio of the gross weight of $HIO_3$, $KClO_3$ and $KClO_4$ to the water was 1:9.1. In the reaction mixture, a molar ratio of the halogen-containing oxidizing agent to HCl was 1:38.8. The reaction mixture was stirred and heated at 50° C. to 60° C. for 10 minutes until all platinum powders were consumed to obtain a Solution 13 containing the potassium chloroplatinate. Solution 13 was then concentrated by rotary evaporation at 100° C. under a reduced pressure (0.5 mbar), followed by a stand at room temperature to obtain crystals of the potassium chloroplatinate. The yield was over 99%.

EXAMPLE 14

Synthesis of Ammonium Chloroplatinate by Using Iodic Acid ($HIO_3$) and Ammonium Perchlorate ($NH_4ClO_4$)

Platinum powders (30 mg) and 2.5 mL of concentrated hydrochloric acid aqueous solution containing 37 wt % of HCl were placed in a 10 mL flat-bottomed flask. Then, 1 mL of aqueous solution composed of the halogen-containing oxidizing agent and water was added into the flask to obtain a reaction mixture. The halogen-containing oxidizing agent contained 30 mg of $HIO_3$ and 80 mg of $NH_4ClO_4$, wherein a weight ratio of the gross weight of $HIO_3$ and $NH_4ClO_4$ to the water was 1:9.1. In the reaction mixture, a molar ratio of the halogen-containing oxidizing agent to HCl was 1:35.2. The reaction mixture was stirred and heated at 50° C. to 60° C. for 10 minutes until all platinum powders were consumed to obtain a Solution 14 containing the ammonium chloroplatinate. Solution 14 was then concentrated by rotary evaporation at 100° C. under a reduced pressure (0.5 mbar), followed by a stand at room temperature to obtain crystals of the ammonium chloroplatinate. The yield was over 99%.

Additionally, the crystal of the ammonium chloroplatinate was measured by ICP-OES. The measured result of the content of platinum in the ammonium chloroplatinate was about 43.95 wt %.

EXAMPLE 15

Synthesis of Sodium Chloroplatinate by Using Sodium Chlorite ($NaClO_2$) and Sodium Chlorate ($NaClO_3$)

Platinum powders (1 g) and 100 mL of concentrated hydrochloric acid aqueous solution containing 37 wt % of HCl were placed in a 500 mL flat-bottomed flask. Then, 40 mL of aqueous solution composed of the halogen-containing oxidizing agent and water was added into the flask to obtain a reaction mixture. The halogen-containing oxidizing agent contained 0.8 g of $NaClO_2$ and 2.4 g of $NaClO_3$, wherein a weight ratio of the gross weight of $NaClO_2$ and $NaClO_3$ to the water was 1:12.5. In the reaction mixture, a molar ratio of the halogen-containing oxidizing agent to HCl was 1:37.5. The reaction mixture was stirred and heated at 50° C. to 60° C. for 30 minutes until all platinum powders were consumed to obtain a Solution 15 containing the sodium chloroplatinate. Solution 15 was then concentrated by rotary evaporation at 100° C. under a reduced pressure (0.5 mbar), followed by a stand at room temperature to obtain crystals of the sodium chloroplatinate. The yield was over 99%.

DISCUSSION OF THE RESULTS

Compared with Comparative Examples 1 and 2, Examples 1 to 15 of the instant disclosure could make chloroplatinic acid or chloroplatinate salts such as sodium chloroplatinate, potassium chloroplatinate and ammonium chloroplatinate without the need of taking a precaution for vigorous reaction because of the use of the specific halogen-containing oxidizing agent, such as $NaClO_2$, $NaClO_3$, $KClO_3$, $HClO_4$, $NaClO_4$, $KClO_4$, $NH_4ClO_4$, $HIO_3$, $KIO_3$, and $NaIO_4$, to oxidize the platinum material. Specifically, in comparison to Comparative Example 1, adopting Example 1 of the instant disclosure to make the chloroplatinic acid could react completely with the same weight of the platinum powders in a shorter time. Similarly, in comparison to Comparative Example 2, adopting Examples 2 to 14 of the instant disclosure to make the chloroplatinate salts also could react completely with the same weight of the platinum powders in a shorter time, even if Example 4 was carried out at a much lower temperature (4° C.), the time required to process the reaction completely in Example 4 still was obviously shorter than the time required in Comparative Example 2. It demonstrates that the method of making an inorganic platinum compound of the instant disclosure has the advantages of time-effectiveness and high efficiency.

Besides, from the result that the yield of Example 4 could still be over 99%, the method of making an inorganic platinum compound of the instant disclosure can be applied at a low temperature. Accordingly, it demonstrates that the instant disclosure is more suitable to be implemented in a place where temperature, pressure, and exhaust emissions of the process are limited strictly.

Based on Examples above, the method of making an inorganic platinum compound of the instant disclosure has the advantage of simplicity, safety, time-effectiveness, cost-effectiveness, environment-friendliness, and high yield.

Even though numerous characteristics and advantages of the instant disclosure have been set forth in the foregoing description, together with details of the structure and features of the disclosure, the disclosure is illustrative only. Changes may be made in the details, especially in matters of shape, size, and arrangement of parts within the principles of the disclosure to the full extent indicated by the broad general meaning of the terms in which the appended claims are expressed.

What is claimed is:

1. A method of making an inorganic platinum compound, comprising steps of:
   Step (A): providing a platinum material and a halogen-containing oxidizing agent; and
   Step (B): treating the platinum material with the halogen-containing oxidizing agent in a hydrochloric acid aqueous solution to obtain an inorganic platinum compound;
   wherein the halogen-containing oxidizing agent excludes chlorine gas, and the halogen-containing oxidizing agent is selected from the group consisting of: a halogen oxoacid, a halogen oxoacid salt, a halogen oxide, and any combination thereof;
   wherein the halogen oxoacid comprises hypobromous acid, bromous acid, bromic acid, hypoiodous acid, iodic acid, or periodic acid;
   the halogen oxoacid salt comprises sodium hypobromite, sodium bromite, sodium bromate, sodium hypoiodite, sodium iodate, sodium periodate, potassium hypobromite, potassium bromite, potassium bromate, potassium hypoiodite, potassium iodate, potassium periodate, or ammonium iodate;
   the halogen oxide comprises dichlorine monoxide, dichlorine trioxide, dibromine monoxide, dibromine trioxide, bromine dioxide, dibromine pentoxide, diiodine monoxide, or diiodine pentoxide; and
   the inorganic platinum compound comprises chloroplatinic acid or chloroplatinate salt.

2. The method of making the inorganic platinum compound as claimed in claim 1, wherein in Step (B), based on the total weight of the hydrochloric acid aqueous solution, the hydrochloric acid aqueous solution contains 18 wt% to 37 wt% of hydrochloric acid.

3. The method of making the inorganic platinum compound as claimed in claim 1, wherein the halogen-containing oxidizing agent is added into the hydrochloric acid aqueous solution in a form of an aqueous solution composed of the halogen-containing oxidizing agent and water; wherein a weight ratio of the halogen-containing oxidizing agent to the water ranges from 1:1 to 1:200.

4. The method of making the inorganic platinum compound as claimed in claim 3, wherein in Step (A), relative to per gram of the platinum material, a usage of the aqueous solution ranges from 1 mL to 1000 mL.

5. The method of making the inorganic platinum compound as claimed in claim 3, wherein in Step (B), a volume ratio of the aqueous solution to the hydrochloric acid aqueous solution ranges from 1:1 to 1:50.

6. The method of making the inorganic platinum compound as claimed in claim 1, wherein in Step (B), a molar ratio of the halogen-containing oxidizing agent to the hydrochloric acid ranges from 1:1 to 1:500.

7. The method of making the inorganic platinum compound as claimed in claim 1, wherein Step (B) is performed at a temperature ranging from −10° C. to 100° C.

8. The method of making the inorganic platinum compound as claimed in claim 7, wherein the temperature in Step (B) ranges from greater than or equal to 4° C. to less than 15° C.

9. The method of making the inorganic platinum compound as claimed in claim 1, wherein Step (B) comprises:
   Step (b1): treating the platinum material with the halogen-containing oxidizing agent in the hydrochloric acid aqueous solution to obtain a solution comprising the inorganic platinum compound; and
   Step (b2): concentrating the solution comprising the inorganic platinum compound to obtain the inorganic platinum compound.

10. The method of making the inorganic platinum compound as claimed in claim 9, wherein Step (b2) is performed by rotary heating evaporation at a temperature ranging from 50° C. to 100° C. and under a pressure ranging from 0.1 mbar to 1.0 mbar.

11. The method of making the inorganic platinum compound as claimed in claim 9, wherein Step (b2) comprises:
- Step (b2-1): concentrating the solution comprising the inorganic platinum compound at a temperature ranging from 30° C. to 100° C. to obtain a concentrated solution; and
- Step (b2-2): placing the concentrated solution at a temperature ranging from 0° C. to 30° C. to obtain the inorganic platinum compound; wherein the inorganic platinum compound is in a crystalline state.

* * * * *